(12) United States Patent
Hall (10) Patent No.: US 8,567,116 B1
(45) Date of Patent: Oct. 29, 2013

(54) HERBICIDE DELIVERY APPARATUS

(76) Inventor: Scott L. Hall, Marcy, NY (US)

( * ) Notice: Subject to any disclaimer, the term of this patent is extended or adjusted under 35 U.S.C. 154(b) by 52 days.

(21) Appl. No.: 13/315,667

(22) Filed: Dec. 9, 2011

(51) Int. Cl.
*A01M 21/04* (2006.01)

(52) U.S. Cl.
USPC .......................................... 47/1.5; 47/58.1 R (58) Field of Classification Search
USPC ........... 47/1.01 R, 1.5, 48.5, 58.1 R, 58.1 SE; 401/209, 214, 215; 239/152, 154, 578, 239/581.1; 119/603, 652, 660, 663
See application file for complete search history.

(56) References Cited

U.S. PATENT DOCUMENTS

| | | | |
|---|---|---|---|
| 1,606,860 A | | 11/1926 | Winn |
| 2,979,757 A | | 4/1961 | Smith |
| 3,232,006 A | * | 2/1966 | Atherton et al. .................. 47/1.5 |
| 3,235,900 A | * | 2/1966 | Klassen ......................... 401/175 |
| 3,552,870 A | | 1/1971 | Brooks |
| 4,457,472 A | * | 7/1984 | Geberth, Jr. .................. 239/532 |
| 4,850,540 A | * | 7/1989 | Taniguchi ..................... 239/579 |
| 4,940,350 A | * | 7/1990 | Kim .............................. 401/209 |
| 5,216,833 A | | 6/1993 | Longer |
| 5,555,673 A | | 9/1996 | Smith |
| 5,875,926 A | * | 3/1999 | Schwartz ......................... 222/79 |
| 6,190,077 B1 | * | 2/2001 | Newson et al. ............... 401/192 |
| 6,991,185 B2 | * | 1/2006 | Brown .......................... 239/414 |
| 7,213,997 B1 | * | 5/2007 | Joyner .......................... 401/197 |
| 2007/0134051 A1 | * | 6/2007 | Todd ............................. 401/205 |

* cited by examiner

*Primary Examiner* — Rob Swiatek
*Assistant Examiner* — Lisa Tsang
(74) *Attorney, Agent, or Firm* — Montgomery Patent & Design; Robert C. Montgomery (57) ABSTRACT

An herbicide delivery device comprises a cane-type structure that applies herbicide directly to unwanted foliage, comprising an ergonomic handle at a top end and a dauber mechanism at a bottom end further comprising a rotating spherical foam rubber applicator. An interior of the cane structure houses a replaceable vessel of liquid herbicide. The dauber mechanism can be removed to access and refill the tube. The dauber dispenses a small amount of herbicide as the applicator is pressed against a surface. In use, the user walks around an outside area and directly places the foam rubber applicator against foliage to dispense the herbicide without endangering any nearby plant life. A protective cap is attached over the dauber mechanism when not in use.

15 Claims, 5 Drawing Sheets

HERBICIDE DELIVERY APPARATUS

RELATED APPLICATIONS

There are currently no applications co-pending with the present application.

FIELD OF THE INVENTION

The present invention relates generally to a fluid applicator, and in particular, to a herbicide applicator which deliver herbicide to vegetation.

BACKGROUND OF THE INVENTION

Eliminating unwanted vegetation such as weeds or other foliage is a common concern for many property occupants. Unwanted vegetation becomes an eyesore and overruns other valued vegetation. Various systems which are utilized to destroy unwanted vegetation are known; all of which discharge some type of herbicide onto a surface.

A common problem with the systems is that the application of the herbicide is uncontrolled. Another problem is that the systems do not contain the herbicide enough to prevent leaks.

Various attempts have been made to provide a delivery system for herbicide. Examples of these attempts can be seen by reference to several U.S. Pat. No. 1,606,860, issued in the name of Winn, describes a system which distributes weed killing liquids in small amounts onto a surface.

U.S. Pat. No. 2,979,757, issued in the name of Smith, describes a cane-type weed killer applicator.

U.S. Pat. No. 5,216,833, issued in the name of Longer, describes a fluid application system.

While these attempts fulfill their respective, particular objectives, each of these references suffer from one (1) or more disadvantages. Many are not suited to provide control of the herbicide. Others are prone to leaks of the herbicide.

SUMMARY OF THE INVENTION

The inventor has recognized the aforementioned inherent problems and lack in the art and observed that there is a need for an herbicide delivery apparatus which offers control of the herbicide and prevents leaks.

Accordingly, it is an object of the present embodiments of the invention to solve at least one (1) of these problems. The inventor has addressed this need by developing an herbicide delivery apparatus that provides control and leak prevention to the herbicide.

To achieve the above objectives, it is an object of the present invention to provide an herbicide delivery apparatus for applying herbicides to vegetation including a body, a dauber assembly, a handle assembly, and a cable connection.

Another object of the present invention is to provide an herbicide delivery apparatus with a handle assembly including a trigger to motion the cable connection within the body.

Yet still another object of the present invention is to provide the dauber assembly with an O-ring to seal the dauber portion.

Yet still another object of the present invention is to provide a dauber which is able to flip one-hundred eighty degrees to apply the herbicide.

Yet still another object of the present invention is to provide an herbicide container for retaining and transferring herbicide.

Yet still another object of the present invention is to provide a dauber cap to be placed onto the dauber when not in use.

Yet still another object of the present invention is to provide a method of utilizing the device that provides a unique means of connecting the cable to the dauber assembly and handle assembly, providing herbicide within the herbicide container and engaging within the cane body, removing the dauber cap, enabling the herbicide to saturate the dauber, engaging the trigger to flip the dauber and expose the saturated half of the dauber to a desired vegetation, releasing the trigger as needed, repeating as needed, and replacing the dauber cap as needed.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY 10 herbicide delivery apparatus
20 dauber assembly
22a dauber sphere
22b first dauber half
22c second dauber half
24 shaft
26 herbicide supply port
30 cable enclosure
32 cable
33 cable tunnel
34 spool
36 dauber cap
38 spring enclosure
39 hook feature
40 spring
42 shaft seal
44 first O-ring
46 cane body
47 herbicide container cavity
50 handle assembly
52 handle grip
54 finger relief
56 pull trigger
57 trigger aperture
58 cable attachment feature
60 friction pulley
80 herbicide container
82 vessel
83 herbicide container cap
84 herbicide 86 male thread
87 female thread
88 nozzle
90 second O-ring
91 access door
92 hinge
94 hasp
100 foliage
105 ground surface
110 user/hand
115 index finger

DETAILED DESCRIPTION OF THE PREFERRED EMBODIMENT

The best mode for carrying out the invention is presented in terms of its preferred embodiment, within FIGS. 1 through 5. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for an herbicide delivery apparatus (herein described as the "apparatus") 10, which provides a hand-held cane-like apparatus that directly applies a controlled quantity of herbicide 84 to unwanted foliage 100 such as weeds. The apparatus 10 utilizes an elongated cane body 46 approximately two (2) inches in diameter and three (3) to (4) feet long. The interior of the cane body 46 comprises an herbicide container cavity 47 designed to accept a cylindrical herbicide container 80 and a bottom portion comprising a mechanical dauber assembly 20 which dispenses a small amount of herbicide 84 as the dauber sphere 22a is compressed. The apparatus 10 allows a user 110 to walk around a yard, driveway, patio, or other outside ground surface 105 and directly apply the herbicide 84 to unwanted foliage 100 without endangering nearby plant life.

Figure 1:
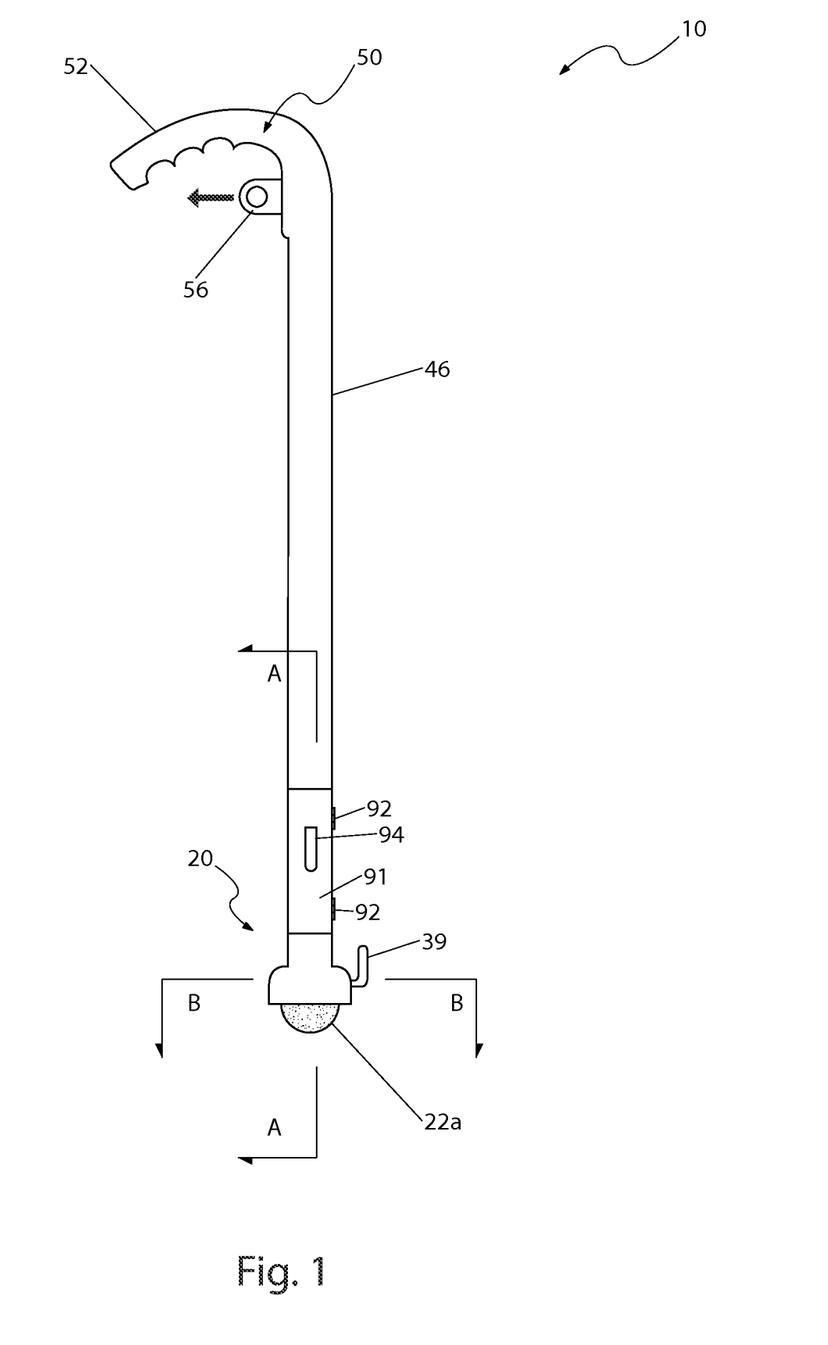
FIG. 1 is a front view of an herbicide delivery apparatus 10, according to a preferred embodiment of the present invention.

Referring now to FIG. 1, a front view of the apparatus 10, according to a preferred embodiment of the present invention, is disclosed. The apparatus 10 comprises a cane body 46 further comprising a lower dauber assembly 20 at a lower end and an upper handle assembly 50 at an upper end. The dauber assembly 20 further comprises an open-celled sponge material which is responsible for restricting absorption of the herbicide 84 comprising a spherical rubber applicator 22a further comprising a first dauber half 22b and a second dauber half 22c. During use, the second dauber half 22c delivers and dispenses a volume of absorbed herbicide 84 onto unwanted foliage 100 as a user 110 presses the apparatus 10 against a ground surface 105 which in turn compresses said second dauber half 22c to displace said herbicide 84 (see FIG. 2). The cane body 46 extends upwardly from the dauber assembly 20 approximately three (3) to four (4) feet to the handle assembly 50.

The cane body 46 comprises a linear form having a generally round cross section and is envisioned to be made of plastic, fiberglass, wood, or other light-weight material. Said cane body 46 is a generally solid member; however, specific portions are hollow so as to facilitate an internal removably attached herbicide container 80 and a dauber assembly 20. The cane body 46 comprises an access door 91 allowing a user 110 to load/unload and discreetly conceal said herbicide container 80 within. Said cane body 46 further comprises an internal cable tunnel 33 designed to discreetly route a length of small-diameter wire rope cable 32 upwardly from the bottom-mounted dauber assembly 20 to the top-mounted handle assembly 50, thereby allowing a user 110 to replenishing a supply of herbicide 84 by actuating a pull trigger portion 56 of said handle assembly 50. The handle assembly 50 comprises an integral portion of the cane body 46 being located at a top end portion providing a user 110 an ergonomic means to grasp and manipulate the apparatus 10 (see FIG. 4).

Figure 2:
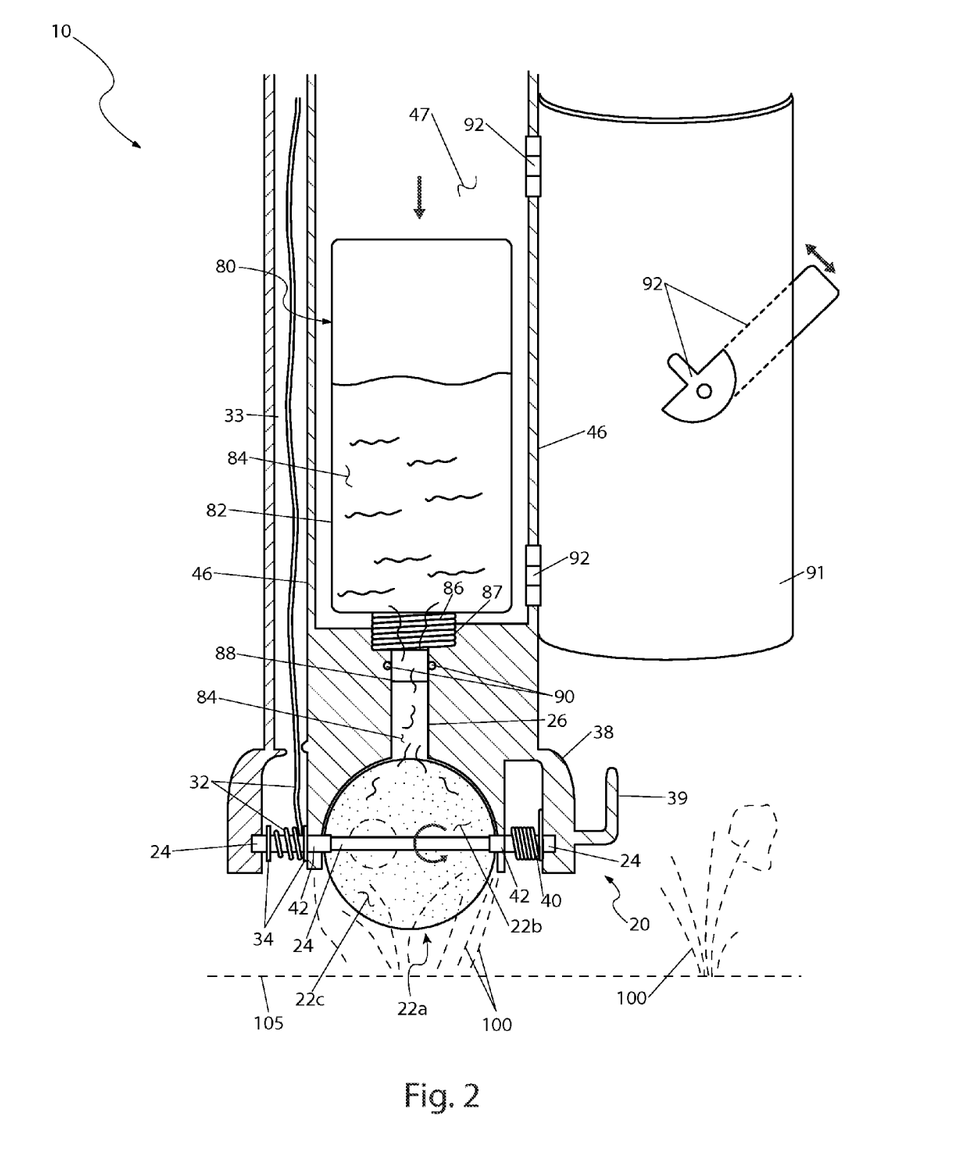
FIG. 2 is a section view of the herbicide delivery apparatus 10 taken along section line A-A (see FIG. 1), according to a preferred embodiment of the present invention.
Figure 3:
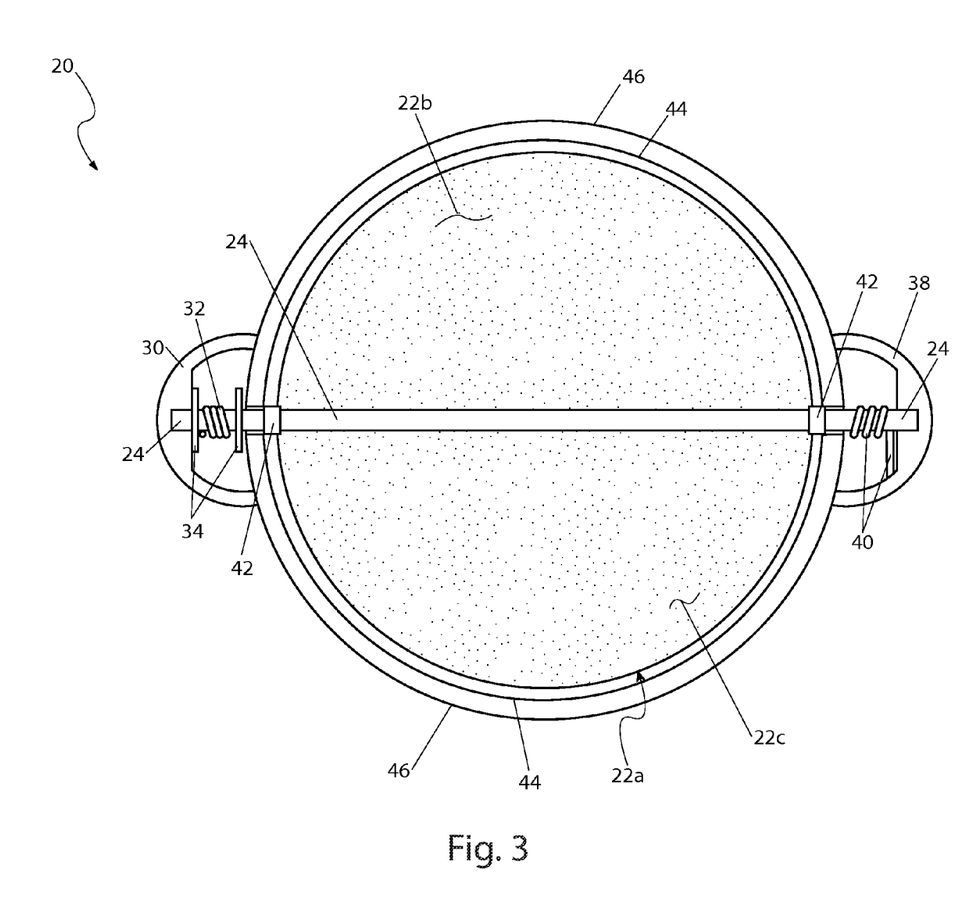
FIG. 3 is another section view of the herbicide delivery apparatus 10 taken along section line B-B (see FIG. 1), according to a preferred embodiment of the present invention.

Referring now to FIGS. 2 and 3, section views of the apparatus 10 taken along section lines A-A and B-B (see FIG. 1), according to a preferred embodiment of the present invention, are disclosed. The apparatus 10 provides a means of controlled application of a liquid herbicide 84 to subjacent unwanted foliage 100. The apparatus 10 comprises a dauber assembly 20 and an herbicide container 80 mounted within the cane body 46. Said herbicide container 80 provides a downward flow of liquid herbicide 84 to the subjacent dauber assembly 20 via a conveying herbicide supply port 26. Said dauber assembly 20 comprises a foam rubber dauber sphere 22a further comprising a top first dauber half 22b and a bottom second dauber half 22c. In use, said dauber sphere 22a absorbs a volume of said herbicide 84 conveyed via the herbicide supply port 26, into the upper first dauber half 22b. Said dauber sphere 22a further comprises a first O-ring 44 being adhesively bonded around an equator area, thereby circumferentially sealing the dauber sphere 22a against an inner spherical surface of the cane body 46, thereby containing said volume of herbicide 84 within the dauber sphere 22a. Said dauber sphere 22a further comprises a metal or plastic shaft 24 which passes horizontally through a center point. The shaft 24 passes through and extends outwardly from both side portions of said dauber sphere 22a. Said shaft 24 comprises an integral spool portion 34 on one (1) end, and an attached torsion spring 40 which encompasses an opposing end portion of said shaft 24. Said 24 further comprises a pair of shaft seals 42 which are aligned with and work in conjunction with the aforementioned first O-ring 44 to contain and seal the herbicide 84 within the dauber sphere 22a, thereby minimizing leakage of the liquid herbicide 84. Said cable spool 34 is contained within an outwardly protruding semi-circular-shaped cable enclosure 30 being an integrally-molded portion of the cane body 46 and positioned along a bottom edge portion. Said spool 34 provides an attachment means to a length of cable 32 being wound around said spool 34 and extending upwardly through a cable tunnel portion 33 being integrated into a vertical side surface of the cane body 46. Said cable 32 is in mechanical communication with the handle assembly 50 (see FIG. 4), thereby allowing a user 110 to utilize said handle assembly 50 to apply a tension upon said cable 32 which in turn causes the shaft 24 and dauber sphere 22a to rotate. Rotation of said dauber sphere 22a causes the dauber halves 22b, 22c to flip one-hundred eighty degrees (180°), thereby conveying herbicide contained within the upper first dauber half 22b from a top position to a subjacent position for immediate application of said herbicide 84. The spring 40 is located within an outwardly protruding semi-circular-shaped spring enclosure 38 at a horizontally opposing position from the aforementioned cable enclosure 30. Said spring enclosure 38 also comprises an integrally-molded portion of the cane body 46 along a bottom edge. The spring 40 applies a torsional force upon said shaft 24 to return said shaft 24 to a "home" position when said cable 32 is released by the user 110.

The herbicide container 80 is discretely housed within an herbicide container cavity portion 47 of the cane body 46 in an inverted orientation, thereby providing a downward flow of liquid herbicide 84 to the dauber assembly 20. Said herbicide container 80 further comprises a transparent or translucent plastic or glass cylindrical vessel 82, a male threaded portion 86, and a cylindrical nozzle 88. The vessel 82 comprises a bottle structure having a fluid capacity of approximately one-quarter (¼) to one-half (½) of a pint and is correspondingly sized to fit snuggly within said herbicide container cavity portion 47. The male threaded portion 86 of the herbicide container 80 threadingly engages a corresponding female threaded portion 87 of the herbicide container cavity portion 47, thereby providing a means to seal in the herbicide 84 while also securing said herbicide container 80 in position. Said herbicide 84 in turn flows downwardly through the male threaded portion 86, through the nozzle 88, and through the aforementioned herbicide supply port 26, before entering the first dauber half 22b. Said herbicide supply port 26 further comprises a second O-ring 90 which provides an additional sealing means against an exterior surface of the nozzle 88 to prevent leakage of the herbicide 84 during transfer from the herbicide container 80 to the dauber assembly 20.

The cane body 46 provides a means to quickly load/unload the herbicide containers 80 via an access door 91 located at an adjacent position with respect to the herbicide container 80. Said access door 91 comprises an open-ended half-cylinder-shaped hinged structure which when closed, provides a matching profile with that of the cane body 46. Said access door 91 further comprises a pair of attaching hinges 92 along a vertical axis and a quarter-turn securing hasp 94.

Figure 4:
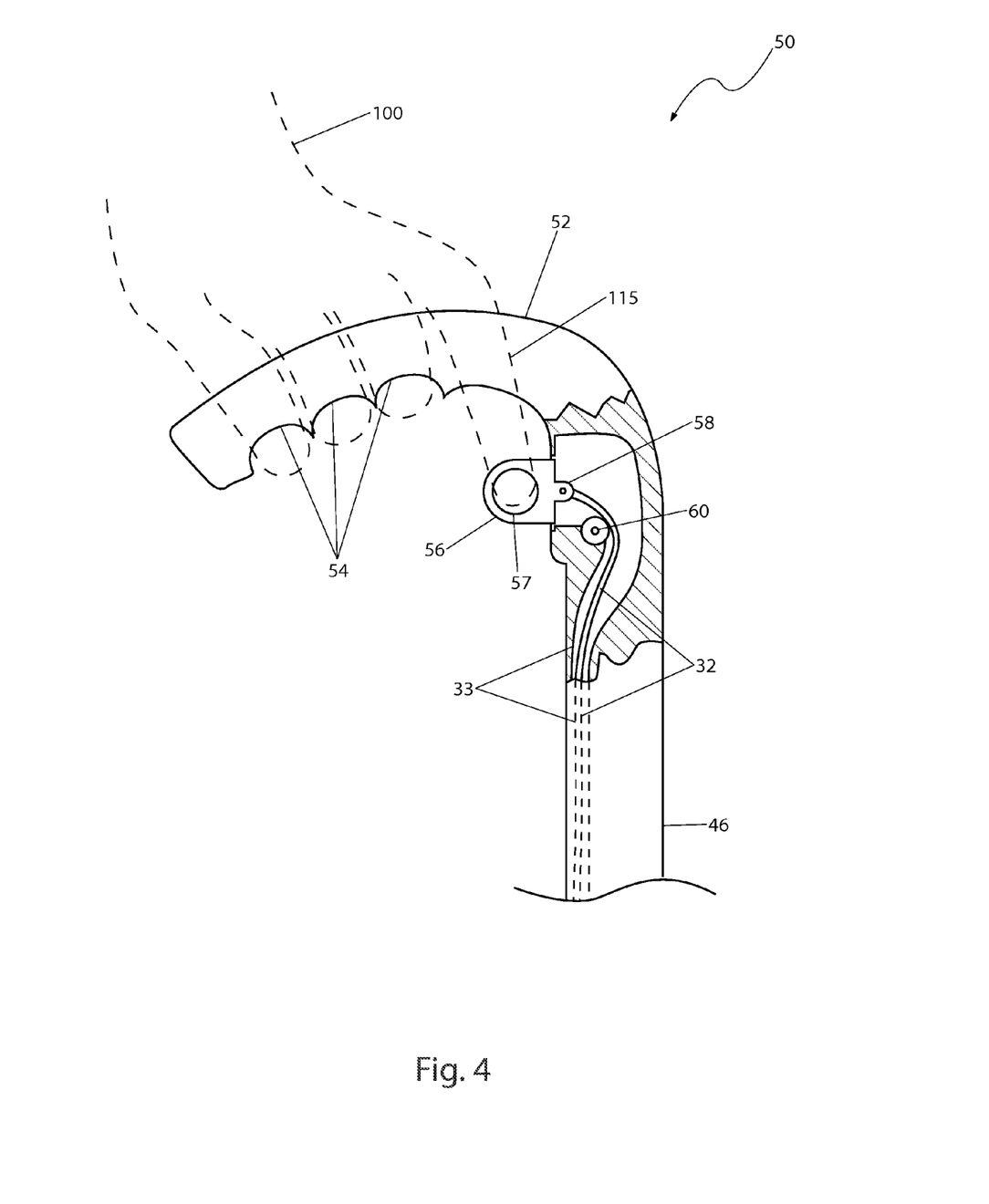
FIG. 4 is a partial cut-away view of a handle assembly portion 50 of the herbicide delivery apparatus 10, according to a preferred embodiment of the present invention; and, FIG. 5 is an inverted view of the herbicide delivery apparatus 10, according to a preferred embodiment of the present invention.

Referring now to FIG. 4, a partial cut-away view of a handle assembly portion 50 of the apparatus 10, according to a preferred embodiment of the present invention, is disclosed. The handle assembly portion 50 of the apparatus 10 provides a user 110 an ability to selectively replenish a flow of liquid herbicide 84 to the dauber assembly 20 while in a standing position, using one (1) hand. The handle assembly 50 comprises an integral upper extension of the cane body 46, forming a hook-shaped appendage which provides easy gripping and manipulation of the apparatus 10. The handle assembly 50 further comprises a handle grip 52 and a pull trigger 56. Said handle grip 52 comprises an arcuate form having a plurality of finger reliefs 54 along a bottom surface and extends to a generally horizontal orientation, thereby allowing a user 110 to grasp said handle grip 52 in an ergonomic manner. The pull trigger 56 is located at a forward bottom position being convenient to a user's 110 index finger 115. Said pull trigger 56 is in mechanical communication with the previously described cable 32 via an integral cable attachment feature 58, thereby enabling the user 110 to upwardly motion said cable 32 as the pull trigger 56 is extended using an index finger portion 115 of the user's hand 110. The handle assembly 50 further comprises an internal miniature cylindrical friction pulley 60 rotatingly affixed to an inner surface of said handle assembly 50 which provides a means to guide said cable 32 into the cable tunnel 33. In use, a user 110 is envisioned to use three (3) fingers and a thumb to hold said handle grip 52 while engaging a remaining index finger 115 through an integral trigger aperture portion 57 of said pull trigger 56. The user 110 then extends and holds said pull trigger 56 to motion said cable 32 outwardly and rotate the dauber sphere 22a (see FIG. 2). After dispensing the herbicide 84 suspended within the dauber sphere 22a, the user 110 relaxes his/her index finger 115 to allow the pull trigger 56 to motion inwardly to a retracted position, being assisted by an opposing tension force being applied by the spring 40 (see FIG. 2). Said motioning of the cable 32 allows the dauber sphere 22a to return to the "home" position, thereby replenishing a volume of herbicide 84 within the dauber sphere 22a.

Figure 5:
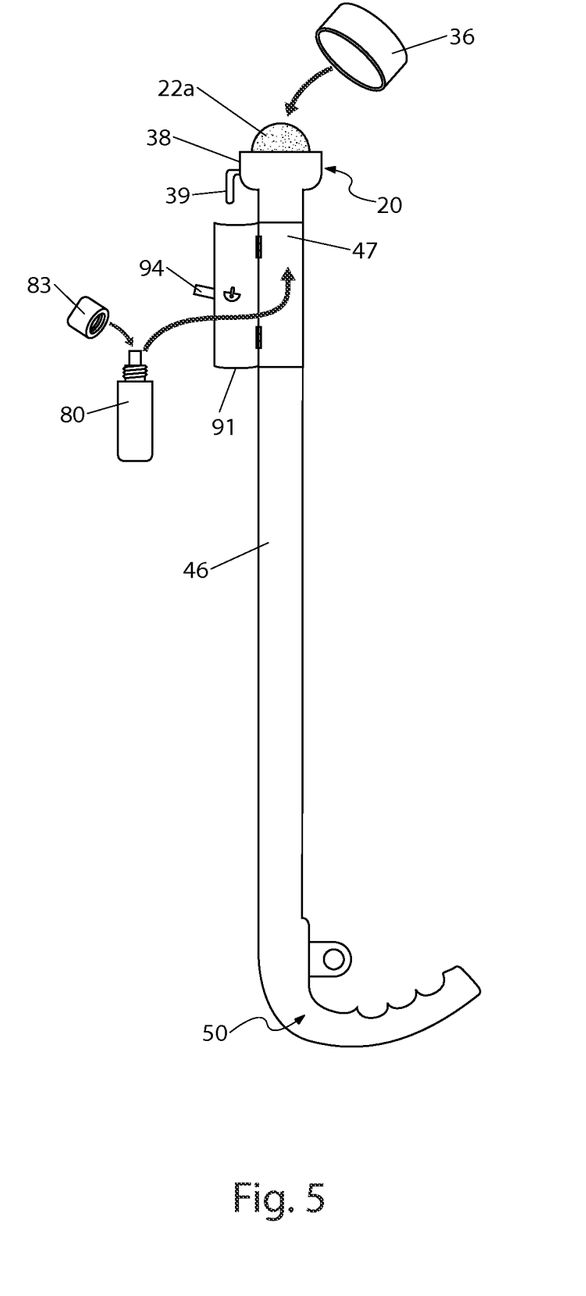

Referring now to FIG. 5, an inverted view of the apparatus 10, according to a preferred embodiment of the present invention, is disclosed. The herbicide container 80 provides normal sealed containment of the herbicide 84 via a threaded herbicide container cap 83 being removably attachable to the previously described male threaded portion 86 of the herbicide container 80. Preparation of the apparatus 10 for use is performed in an inverted position and utilizing the access door 91 to enable insertion of the herbicide container 80 into the herbicide container cavity 47. Subsequently, the male threaded portion of the herbicide container 80 is threadingly engaged with the previously described female threaded portion 87 of the cane body 46.

It is envisioned that at least one (1) herbicide container 80 may be purchased with the apparatus 10 and filled with various types of herbicide 84 for different types of foliage 100, used to dispense herbicide 84 onto unwanted foliage 100, and cleaned for subsequent reuse. However, it is further understood that said herbicide container 80 may be provides in a pre-filled form having various herbicides 84 and may be sold as a purchased and disposable commodity, and may possibly be sold as a refill pack containing a plurality of herbicide containers 80.

The apparatus 10 also comprises a cylindrical dauber cap 36 to protect the dauber assembly 20 when the apparatus 10 is not in use. Said dauber cap 36 is affixed to and covers a bottom portion of the dauber assembly 20 via a friction fit. The cane body 46 also comprises an integrally-molded hanging hook feature 39 forming an "L"-shaped appendage which is envisioned to protrude outwardly from the spring enclosure 38, thereby providing a means to hang and store the apparatus 10 upon a wall surface. The hanging and storing of the apparatus 10 in an inverted position prevents any herbicide 84 from leaking out.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be prepared and utilized as indicated in FIGS. 1 through 5.

The method of preparing and utilizing the apparatus 10 may be achieved by performing the following steps: procuring the apparatus 10; inverting the apparatus 10; opening the access door 91 using the hasp 92; removing a herbicide container cap portion 83 from the herbicide container 80; inserting the herbicide container 80 through the access door 91 and into the herbicide container cavity 47; threadingly engaging and tightening the male threaded portion of the herbicide container 80 with the female threaded portion 87 of the cane body 46; closing and latching the access door 91; removing the dauber cap 36 from the dauber assembly 20; returning the apparatus 10 to an upright orientation; allowing a brief period of time for the herbicide 84 to pass from the herbicide container 80, through the herbicide supply port 26, and to be absorbed into the first dauber half 22b; holding the handle grip portion 52 of the handle assembly 50 using three (3)

fingers and a thumb of the user's 110 hand; engaging the trigger aperture 57 portion of the pull trigger 56 using one's index finger 115; motioning outwardly and holding the pull trigger 56 to correspondingly motion the cable 32 which in turn rotates the spool 34 and dauber sphere 22a, thereby positioning the herbicide 84 engorged first dauber half 22b at a bottom position and the second dauber half 22c at an upper position to absorb a volume of herbicide 84; dispensing an amount of herbicide 84 suspended within the first dauber half 22b by applying a proportional downward compressive force upon said dauber sphere 22a to displace a desired volume of herbicide 84 upon unwanted foliage 100 located upon the ground surface 105; continuing to press said dauber sphere 22a upon additional foliage 100 in a repetitive manner until exhausting the herbicide 84 within said first dauber half 22b; replenishing the dispensable herbicide 84 by allowing the pull trigger 56 to return to the retracted position by relaxing one's index finger 115; allowing the dauber sphere 22a to rotate one-hundred eighty degrees (180°) to the "home" position and thereby position the engorged second dauber half 22c at a bottom position; continuing to dispense the herbicide 84 from the second dauber half 22c in like manner; repeating the above herbicide 84 dispensing and replenishing steps until the herbicide container 80 is empty; inverting the apparatus 10 to install a full herbicide container 80 as described above; continuing to dispense herbicide 84 until completing a foliage 100 elimination project; storing the apparatus 10 by replacing the dauber cap 36 and hanging the apparatus 10 upon a wall surface using the hook feature 39; and, benefiting from a convenient means to dispense herbicide 84 upon unwanted foliage 100 from a standing position in a "one-handed" manner afforded the user 110 of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An herbicide delivery apparatus for applying herbicide to foliage, said herbicide delivery apparatus comprising:
    a cane body including:
        a dauber assembly;
        a handle assembly; and,
        a cable connecting said dauber assembly to said handle assembly; and,
    an herbicide container having herbicide housed therein, said herbicide container being located within said cane body;
    wherein said dauber assembly includes a dauber sphere having a first dauber half and a second dauber half, said second dauber half being in communication with said herbicide thereby dispensing said herbicide onto the foliage as said dauber sphere is pressed against a ground surface and said handle assembly is triggered.

2. The herbicide delivery apparatus of claim 1, wherein said handle assembly includes a pull trigger attached to said cable, said cable traveling inside said cane body from said pull trigger to said dauber assembly.

3. The herbicide delivery apparatus of claim 2, wherein said dauber sphere comprises:
    a dauber O-ring connected around an equator area thereof and thereby circumferentially sealing a portion of said dauber sphere against an inner spherical surface of said cane body;
    a shaft passing through and extending outwardly from opposed side portions of said dauber sphere, said shaft having a spool located at one end thereof and further having a torsion spring located on another end thereof; and,
    a plurality of shaft seals aligned with said dauber O-ring;
    wherein one end of said cable is wrapped about said spool such that said shaft and dauber sphere are caused to rotate as said cable is tensioned and released via said pull trigger.

4. The herbicide delivery apparatus of claim 3, wherein said first and second dauber halves flip one-hundred eighty degrees when said shaft rotates and thereby convey herbicide in said first dauber half from a top position to a subjacent position relative to said shaft.

5. The herbicide delivery apparatus of claim 3, wherein said torsion spring applies a torsional force upon said shaft thereby returning said shaft to a home position when said pull trigger is released.

6. The herbicide delivery apparatus of claim 1, wherein said herbicide container comprises:
    a male portion engaged with said cane body; and,
    a nozzle in fluid communication with said male portion;
    wherein a nozzle O-ring is engaged against an exterior surface of said nozzle to prevent leakage of said herbicide during transfer of said herbicide from said herbicide container to said dauber assembly.

7. The herbicide delivery apparatus of claim 2, wherein said cable is urged in an upward motion as said pull trigger is retracted along a horizontal path, said dauber sphere being rotated when said pull trigger is retracted away from said cane body as well as returned towards said cane body along the horizontal path.

8. An herbicide delivery apparatus for applying herbicide to foliage, said herbicide delivery apparatus comprising:
    a cane body including:
        a dauber assembly;
        a handle assembly; and,
        a cable operably connecting said dauber assembly to said handle assembly; and,
    an herbicide container having herbicide housed therein, said herbicide container being located at an inverted position within said cane body;
    wherein said dauber assembly includes a dauber sphere having a first dauber half and a second dauber half, said second dauber half being in fluid communication with said herbicide thereby dispensing said herbicide onto the foliage as said dauber sphere is pressed against a ground surface and said handle assembly is triggered.

9. The herbicide delivery apparatus of claim 8, wherein said handle assembly includes a pull trigger attached to said cable, said cable traveling inside said cane body from said pull trigger to said dauber assembly.

10. The herbicide delivery apparatus of claim 9, wherein said dauber sphere comprises:
    a dauber O-ring connected around an equator area thereof and thereby circumferentially sealing a portion of said dauber sphere against an inner spherical surface of said cane body;

a shaft passing through and extending outwardly from opposed side portions of said dauber sphere, said shaft having a spool located at one end thereof and further having a torsion spring located on another end thereof; and, a plurality of shaft seals aligned with said dauber O-ring;

wherein one end of said cable is wrapped about said spool such that said shaft and dauber sphere are caused to rotate as said cable is tensioned and released via said pull trigger.

11. The herbicide delivery apparatus of claim 10, wherein said first and second dauber halves flip one-hundred eighty degrees when said shaft rotates and thereby convey herbicide in said first dauber half from a top position to a subjacent position relative to said shaft.

12. The herbicide delivery apparatus of claim 10, wherein said torsion spring applies a torsional force upon said shaft thereby returning said shaft to a home position when said pull trigger is released.

13. The herbicide delivery apparatus of claim 8, wherein said herbicide container comprises:

a male portion engaged with said cane body; and, a nozzle in fluid communication with said male portion;

wherein a nozzle O-ring is engaged against an exterior surface of said nozzle to prevent leakage of said herbicide during transfer of said herbicide from said herbicide container to said dauber assembly.

14. The herbicide delivery apparatus of claim 9, wherein said cable is urged in an upward motion as said pull trigger is retracted along a horizontal path, said dauber sphere being rotated when said pull trigger is retracted away from said cane body as well as returned towards said cane body along the horizontal path.

15. A method of utilizing an herbicide delivery apparatus for applying herbicide to foliage, said method comprising the steps of:

providing a cane body including a dauber assembly, a handle assembly and a cable;

operably connecting said cable to said dauber assembly and said handle assembly;

providing an herbicide container having herbicide housed therein;

locating said herbicide container at an inverted position within said cane body;

wherein said dauber assembly includes a dauber sphere having a first dauber half and a second dauber half;

fluidly communicating said second dauber half with said herbicide; and, dispensing said herbicide onto the foliage as said dauber sphere is pressed against a ground surface and said handle assembly is triggered.

\* \* \* \* \*